US010300796B2

(12) United States Patent
Ito et al.

(10) Patent No.: US 10,300,796 B2
(45) Date of Patent: *May 28, 2019

(54) DRIVE DEVICE, METHOD FOR CONTROLLING THE SAME, AND TRANSPORT APPARATUS

(71) Applicant: HONDA MOTOR CO., LTD., Tokyo (JP)

(72) Inventors: Yoshihiro Ito, Wako (JP); Daijiro Takizawa, Wako (JP); Kenji Kikuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

This patent is subject to a terminal disclaimer.

(21) Appl. No.: 15/292,123

(22) Filed: Oct. 13, 2016

(65) Prior Publication Data

US 2017/0101018 A1    Apr. 13, 2017

(30) Foreign Application Priority Data

Oct. 13, 2015  (JP) ................................ 2015-202256

(51) Int. Cl.
    B60L 11/18     (2006.01)
    B60W 10/26    (2006.01)

(52) U.S. Cl.
    CPC ....... B60L 11/1803 (2013.01); B60L 11/1861 (2013.01); B60L 11/1868 (2013.01); Y02T 10/7005 (2013.01); Y02T 10/7044 (2013.01); Y02T 10/7066 (2013.01)

(58) Field of Classification Search
    CPC .............. B60L 11/1803; B60L 11/1868; B60L 11/1861; Y02T 10/7005
    See application file for complete search history.

(56) References Cited

U.S. PATENT DOCUMENTS

2010/0133025 A1* 6/2010 Flett .......................... B60K 6/46
                                                            180/65.22

FOREIGN PATENT DOCUMENTS

JP    2010-283932    12/2010
JP    2011-199934    10/2011
JP    2014-015113     1/2014

(Continued)

OTHER PUBLICATIONS

Japanese Office Action for corresponding JP Application No. 2015-202256, dated Jun. 6, 2017 (w/ English machine translation).

Primary Examiner — Rexford N Barnie
Assistant Examiner — Thai H Tran
(74) Attorney, Agent, or Firm — Mori & Ward, LLP

(57) ABSTRACT

A drive device includes a first energy storage, a second energy storage, a voltage converter, a driver, and circuitry. The first energy storage has a first power weight density and a first energy weight density. The second energy storage has a second power weight density higher than the first power weight density and a second energy weight density lower than the first weight density. The voltage converter converts a voltage output from the second energy storage. The driver is driven with power supplied from at least one of the first energy storage and the second energy storage. The circuitry is configured to interrupt current from the driver or from the second energy storage to the first energy storage. The circuitry is configured to control the voltage converter.

13 Claims, 10 Drawing Sheets

(56) References Cited

FOREIGN PATENT DOCUMENTS

| JP | 2014-155297 | 8/2014 |
| JP | 2015-061369 | 3/2015 |

* cited by examiner

DRIVE DEVICE, METHOD FOR CONTROLLING THE SAME, AND TRANSPORT APPARATUS

CROSS-REFERENCE TO RELATED APPLICATIONS

The present application claims priority under 35 U.S.C. § 119 to Japanese Patent Application No. 2015-202256, filed Oct. 13, 2015, entitled "Drive Device, Method for Controlling the same, and Transport Apparatus." The contents of this application are incorporated herein by reference in their entirety.

BACKGROUND

1. Field

The present disclosure relates to a drive device, a method for controlling the drive device, and a transport apparatus.

2. Description of the Related Art

Japanese Unexamined Patent Application Publication No. 2014-155297 discloses a power supply system that supplies power to a drive device. The power supply system includes a first energy storage device, a converter that boosts the voltage of the first energy storage device and supplies the boosted voltage to the drive device, a second energy storage device connected in parallel to the converter with respect to the drive device, a diode that prevents power from being supplied from the drive device side or the first energy storage device side to the second energy storage device, and an electronic control unit (ECU). The ECU controls the converter by using either a power control mode for performing control so that the power to be supplied from the first energy storage device to the drive device is equal to the required target power or a voltage control mode for performing control so that the voltage to be applied to the drive device is equal to the target voltage.

Japanese Unexamined Patent Application Publication No. 2015-061369 is another example of related art.

SUMMARY

According to a first aspect of the present invention, a drive device includes a first energy storage, a second energy storage, a voltage converter, a driver, and circuitry. The first energy storage has a first power weight density and a first energy weight density. The second energy storage has a second power weight density higher than the first power weight density and a second energy weight density lower than the first weight density. The voltage converter converts a voltage output from the second energy storage. The driver is driven with power supplied from at least one of the first energy storage and the second energy storage. The circuitry is configured to interrupt current from the driver or from the second energy storage to the first energy storage. The circuitry is configured to control the voltage converter based on an optimum voltage to output the optimum voltage, with which a driving efficiency of the driver according to a required driving force for the driver is greater than or equal to a threshold value, in a case where the optimum voltage is higher than the voltage of the first energy storage and where a relationship between a voltage output by the first energy storage and a voltage output by the second energy storage satisfies all of a first condition, a second condition, and a third condition. The voltage of the first energy storage is less than or equal to a withstand voltage limit of the driver in the first condition. The voltage of the first energy storage is less than or equal to a first value and the voltage converter converting the voltage of the second energy storage with a maximum conversion rate so as to obtain the first value in the second condition. The voltage of the first energy storage is greater than or equal to a second value and the voltage converter converting the voltage of the second energy storage with a minimum conversion rate so as to obtain the second value in the third condition.

According to a second aspect of the present invention, a drive device includes a first energy storage, a second energy storage, a voltage converter, a driver, and circuitry. The first energy storage has a first power weight density and a first energy weight density. The second energy storage has a second power weight density higher than the first power weight density and a second energy weight density lower than the first weight density. The voltage converter converts a voltage output from the second energy storage. The driver is driven with power supplied from at least one of the first energy storage and the second energy storage. The circuitry is configured to interrupt current from the driver or from the second energy storage to the first energy storage. The circuitry is configured to control the voltage converter based on a power of the first energy storage and a required driving force for the driver in such a manner as to allow power to be supplied to the driver from both the first energy storage and the second energy storage in a case where an optimum voltage, with which a driving efficiency of the driver according to a required driving force for the driver is greater than or equal to a threshold value, is less than or equal to the voltage of the first energy storage and where a relationship between a voltage output by the first energy storage and a voltage output by the second energy storage satisfies all of a first condition, a second condition, and a third condition. The voltage of the first energy storage is less than or equal to a withstand voltage limit of the driver in the first condition. The voltage of the first energy storage is less than or equal to a first value and the voltage converter converting the voltage of the second energy storage with a maximum conversion rate so as to obtain the first value in the second condition. The voltage of the first energy storage is greater than or equal to a second value and the voltage converter converting the voltage of the second energy storage with a minimum conversion rate so as to obtain the second value in the third condition.

According to a third aspect of the present invention, a drive device includes a first energy storage, a second energy storage, a voltage converter, a driver, and circuitry. The first energy storage has a first power weight density and a first energy weight density. The second energy storage has a second power weight density higher than the first power weight density and a second energy weight density lower than the first weight density. The voltage converter converts a voltage output from the second energy storage. The driver is driven with power supplied from at least one of the first energy storage and the second energy storage. The circuitry is configured to interrupt current from the driver or from the second energy storage to the first energy storage. The circuitry is configured to control the voltage converter so that the first energy storage and the second energy storage interchange power with each other, without voltage conversion by the voltage converter, in such a manner that the first energy storage and the second energy storage are connected to each other via a interrupter in a case where a relationship between a voltage output by the first energy storage and a voltage output by the second energy storage does not satisfy all of a first condition, a second condition, and a third condition. The voltage of the first energy storage is less than or equal to a withstand voltage limit of the driver in the first condition. The voltage of the first energy storage is less than or equal to a first value and the voltage converter converting the voltage of the second energy storage with a maximum conversion rate so as to obtain the first value in the second condition. The voltage of the first energy storage is greater than or equal to a second value and the voltage converter converting the voltage of the second energy storage with a minimum conversion rate so as to obtain the second value in the third condition.

According to a fourth aspect of the present invention, a method for controlling a drive device, includes interrupting current from a driver or from a second energy storage to a first energy storage. The method includes controlling a voltage converter based on an optimum voltage to output the optimum voltage, with which a driving efficiency of the driver according to a required driving force for the driver is greater than or equal to a threshold value, in a case where the optimum voltage is higher than the voltage of the first energy storage and where a relationship between a voltage output by the first energy storage and a voltage output by the second energy storage satisfies all of a first condition, a second condition, and a third condition. The voltage of the first energy storage is less than or equal to a withstand voltage limit of the driver in the first condition. The voltage of the first energy storage is less than or equal to a first value and the voltage converter converting the voltage of the second energy storage with a maximum conversion rate so as to obtain the first value in the second condition. The voltage of the first energy storage is greater than or equal to a second value and the voltage converter converting the voltage of the second energy storage with a minimum conversion rate so as to obtain the second value in the third condition.

According to a fifth aspect of the present invention, a method for controlling a drive device, includes interrupting current from a driver or from a second energy storage to a first energy storage. The method includes controlling a voltage converter based on a power of the first energy storage and a required driving force for the driver in such a manner as to allow power to be supplied to the driver from both the first energy storage and the second energy storage in a case where an optimum voltage, with which a driving efficiency of the driver according to a required driving force for the driver is greater than or equal to a threshold value, is less than or equal to the voltage of the first energy storage and where a relationship between a voltage output by the first energy storage and a voltage output by the second energy storage satisfies all of a first condition, a second condition, and a third condition. The voltage of the first energy storage is less than or equal to a withstand voltage limit of the driver in the first condition. The voltage of the first energy storage is less than or equal to a first value and the voltage converter converting the voltage of the second energy storage with a maximum conversion rate so as to obtain the first value in the second condition. The voltage of the first energy storage is greater than or equal to a second value and the voltage converter converting the voltage of the second energy storage with a minimum conversion rate so as to obtain the second value in the third condition.

According to a sixth aspect of the present invention, a method for controlling a drive device, includes interrupting current from a driver or from a second energy storage to a first energy storage. The method includes controlling a voltage converter so that the first energy storage and the second energy storage interchange power with each other, without voltage conversion by the voltage converter, in such a manner that the first energy storage and the second energy storage are connected to each other via a interrupter in a case where a relationship between a voltage output by the first energy storage and a voltage output by the second energy storage does not satisfy all of a first condition, a second condition, and a third condition. The voltage of the first energy storage is less than or equal to a withstand voltage limit of the driver in the first condition. The voltage of the first energy storage is less than or equal to a first value and the voltage converter converting the voltage of the second energy storage with a maximum conversion rate so as to obtain the first value in the second condition. The voltage of the first energy storage is greater than or equal to a second value and the voltage converter converting the voltage of the second energy storage with a minimum conversion rate so as to obtain the second value in the third condition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
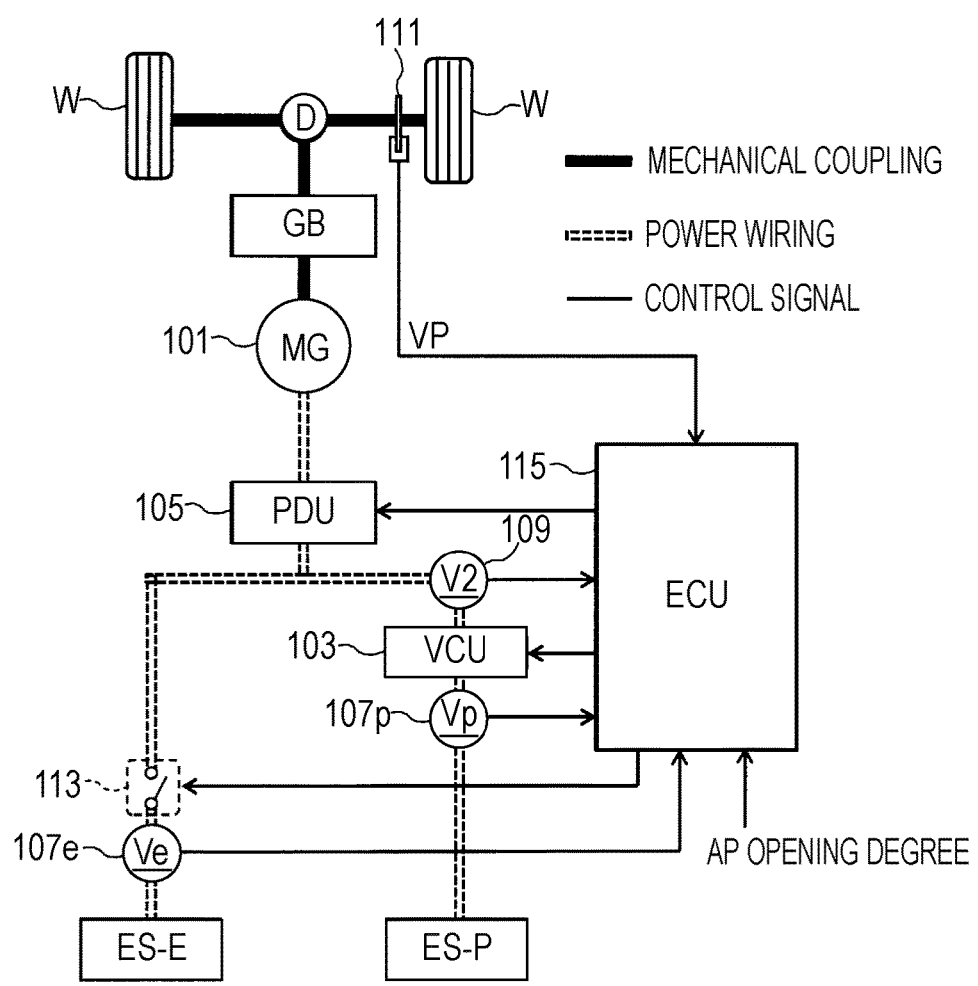
FIG. 1 is a block diagram illustrating an internal configuration of a motor-driven vehicle according to an embodiment of the present disclosure.

The embodiments will now be described with reference to the accompanying drawings, wherein like reference numerals designate corresponding or identical elements throughout the various drawings.

Embodiments of the present disclosure will be described hereinafter with reference to the drawings.

FIG. 1 is a block diagram illustrating an internal configuration of a motor-driven vehicle according to an embodiment of the present disclosure. A one-motor (1-MOT) type motor-driven vehicle illustrated in FIG. 1 includes a motor generator (MG) 101, a high-capacity battery ES-E, a high-power battery ES-P, a voltage control unit (VCU) 103, a power drive unit (PDU) 105, voltage sensors 107e and 107p, a V2 voltage sensor 109, a vehicle velocity sensor 111, a contactor 113, and an electronic control unit (ECU) 115. In FIG. 1, the thick solid line indicates mechanical coupling, the double-dotted line indicates power wiring, and the thin solid line indicates a control signal.

The motor generator 101 is driven by power obtained from at least one of the high-capacity battery ES-E and the high-power battery ES-P to generate motive power for the motor-driven vehicle to travel. A torque generated by the motor generator 101 is transmitted to driving wheels W through a gear box GB including a variable-ratio gear set or a fixed-ratio gear set and through a differential gear D. Further, the motor generator 101 operates as a power generator when the motor-driven vehicle slows down, and outputs a braking force for braking the motor-driven vehicle. Regenerative power generated by causing the motor generator 101 to operate as a power generator is input preferentially to the high-power battery ES-P out of the high-capacity battery ES-E and the high-power battery ES-P.

The high-capacity battery ES-E includes a plurality of energy storage cells such as lithium-ion cells or nickel-hydrogen cells, and supplies high-voltage power to the motor generator 101. The high-power battery ES-P also includes a plurality of energy storage cells such as lithium-ion cells or nickel-hydrogen cells, and supplies high-voltage power to the motor generator 101 through the VCU 103. The high-power battery ES-P is connected in parallel to the high-capacity battery ES-E with respect to the PDU 105 through the VCU 103. Furthermore, the voltage of the high-power battery ES-P is typically lower than the voltage of the high-capacity battery ES-E. Thus, the power of the high-power battery ES-P is boosted by the VCU 103 to a level equal to or greater than that of the voltage of the high-capacity battery ES-E and is then supplied to the motor generator 101 through the PDU 105.

The high-capacity battery ES-E and the high-power battery ES-P are not limited to the secondary battery such as a nickel-hydrogen battery or lithium-ion battery described above. For example, the high-power battery ES-P may be implemented as a capacitor capable of charging and discharging a large amount of power within a short period of time although the storage capacity is low.

In addition, the high-capacity battery ES-E and the high-power battery ES-P have different characteristics. The high-capacity battery ES-E has a lower power weight density and a higher energy weight density than the high-power battery ES-P. On the other hand, the high-power battery ES-P has a lower energy weight density and a higher power weight density than the high-capacity battery ES-E. In this manner, the high-capacity battery ES-E is relatively superior in terms of energy weight density, whereas the high-power battery ES-P is relatively superior in terms of power weight density. The energy weight density is energy per unit weight, expressed in Wh/kg, and the power weight density is power per unit weight, expressed in W/kg. Thus, the high-capacity battery ES-E, which is superior in terms of energy weight density, is an energy storage unit mainly used for high-capacity purposes, and the high-power battery ES-P, which is superior in terms of power weight density, is an energy storage unit mainly used for high-power purposes.

The difference in characteristics between the high-capacity battery ES-E and the high-power battery ES-P is due to a variety of parameters defined by the structure, material, and the like of the components of the battery, such as electrodes, active materials, and electrolytic materials or solutions. For example, the charging capacity, which is a parameter indicating the total amount of chargeable and dischargeable electricity, is higher in the high-capacity battery ES-E than in the high-power battery ES-P. On the other hand, the C-rate characteristic, which is a parameter indicating the resistance of the charging capacity to deterioration due to charging and discharging, and the internal resistance (impedance), which is a parameter indicating a value of electrical resistance to charging and discharging, is higher in the high-power battery ES-P than in the high-capacity battery ES-E.

The VCU 103 boosts the output voltage of the high-power battery ES-P while maintaining it in the form of direct-current (DC) voltage. When the motor-driven vehicle slows down, the VCU 103 decreases the voltage of the power generated by the motor generator 101 and converted into a DC voltage. Further, the VCU 103 decreases the output voltage of the high-capacity battery ES-E while maintaining it in the form of DC voltage. The power whose voltage has been decreased by the VCU 103 is charged preferentially in the high-power battery ES-P. The voltage level or current level of the DC power output from the VCU 103 is controlled by the ECU 115.

Figure 2:
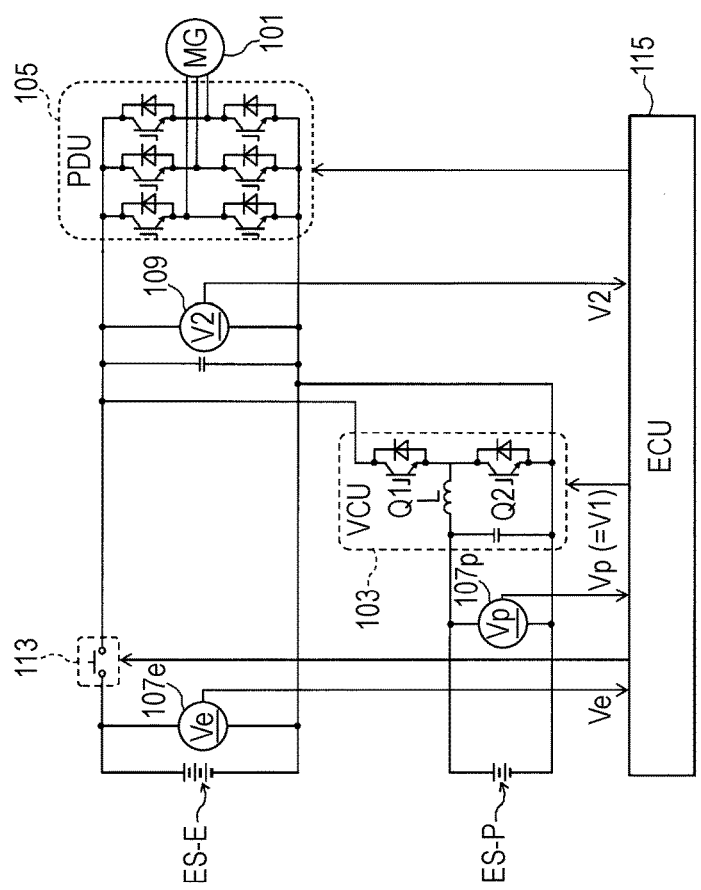
FIG. 2 is an electrical circuit diagram illustrating a relationship between a high-capacity battery, a high-power battery, a contactor, a voltage control unit (VCU), a power drive unit (PDU), and a motor generator.

FIG. 2 is an electrical circuit diagram illustrating a relationship among the high-capacity battery ES-E, the high-power battery ES-P, the contactor 113, the VCU 103, the PDU 105, and the motor generator 101. As illustrated in FIG. 2, the VCU 103 receives a voltage Vp of the high-power battery ES-P and performs an operation of switching on or off two switching elements Q1 and Q2 to boost the voltage Vp of the high-power battery ES-P to a level greater than or equal to that of a voltage Ve of the high-capacity battery ES-E. Alternatively, through-mode control (direct-coupling control) in which the switching element Q1, whose emitter is connected to a reactor L, is turned on while the switching element Q2 is turned off, may be performed instead of the operation of switching on or off the two switching elements Q1 and Q2. The through-mode control allows the high-capacity battery ES-E and the high-power battery ES-P to be directly coupled to each other through the contactor 113 without causing the VCU 103 to boost or lower the voltage.

The PDU 105 converts the DC voltage into an alternating-current (AC) voltage and supplies three-phase current to the motor generator 101. Further, the PDU 105 converts an AC voltage which is input during the regenerative operation of the motor generator 101 into a DC voltage.

The voltage sensor 107p detects the voltage Vp of the high-power battery ES-P. The voltage Vp of the high-power battery ES-P is also a primary voltage V1 of the VCU 103. A signal indicating the voltage Vp detected by the voltage sensor 107p is delivered to the ECU 115. The voltage sensor 107e detects the voltage Ve of the high-capacity battery ES-E. A signal indicating the voltage Ve detected by the voltage sensor 107e is delivered to the ECU 115. The V2 voltage sensor 109 detects a secondary voltage V2 of the VCU 103 which is obtained by boosting the voltage Vp (=V1) of the high-power battery ES-P. A signal indicating the secondary voltage V2 detected by the V2 voltage sensor 109 is delivered to the ECU 115. The vehicle velocity sensor 111 detects the traveling velocity (vehicle velocity) VP of the motor-driven vehicle. A signal indicating the vehicle velocity VP detected by the vehicle velocity sensor 111 is delivered to the ECU 115.

The contactor 113 connects or disconnects the current path from the PDU 105 or the VCU 103 to the high-capacity battery ES-E. The contactor 113 is opened or closed under control of the ECU 115.

The ECU 115 controls the PDU 105 and the VCU 103 and also controls the opening and closing of the contactor 113. Further, the ECU 115 calculates a driving force required for the motor generator 101 on the basis of the vehicle velocity VP indicated by the signal obtained from the vehicle velocity sensor 111 and the opening degree of the accelerator pedal (AP opening degree) corresponding to the amount by which the accelerator pedal has been operated by the driver of the motor-driven vehicle, and calculates an optimum voltage at which the driving efficiency of the motor generator 101 corresponding to the required driving force is greater than or equal to a threshold value. The driving efficiency of the motor generator 101, which is driven by the optimum voltage, is the highest.

The ECU 115 further performs power distribution control by using the VCU 103 so as to exploit the respective characteristics of the high-capacity battery ES-E and the high-power battery ES-P, which have different characteristics. The power distribution control allows the high-capacity battery ES-E to be used to supply constant power to the motor generator 101 at all times while the motor-driven vehicle is traveling, and allows the high-power battery ES-P to be used to supply power to the motor generator 101 when a large driving force is necessary to cause the motor-driven vehicle to move. The regenerative power generated by the motor generator 101 or the dump power of the high-capacity battery ES-E is preferentially input to the high-power battery ES-P. The ECU 115 controls the VCU 103 to boost or lower the voltage required for exchange of power between the high-power battery ES-P and the motor generator 101.

Moreover, the ECU 115 controls the VCU 103 in different modes in accordance with the relationship between the voltage Ve of the high-capacity battery ES-E and the voltage Vp of the high-power battery ES-P and the relationship between the voltage Ve of the high-capacity battery ES-E and the optimum voltage of the motor generator 101. The details of the control will be described below.

A description will now be given of how the high-capacity battery ES-E and the high-power battery ES-P are used.

Figure 3:
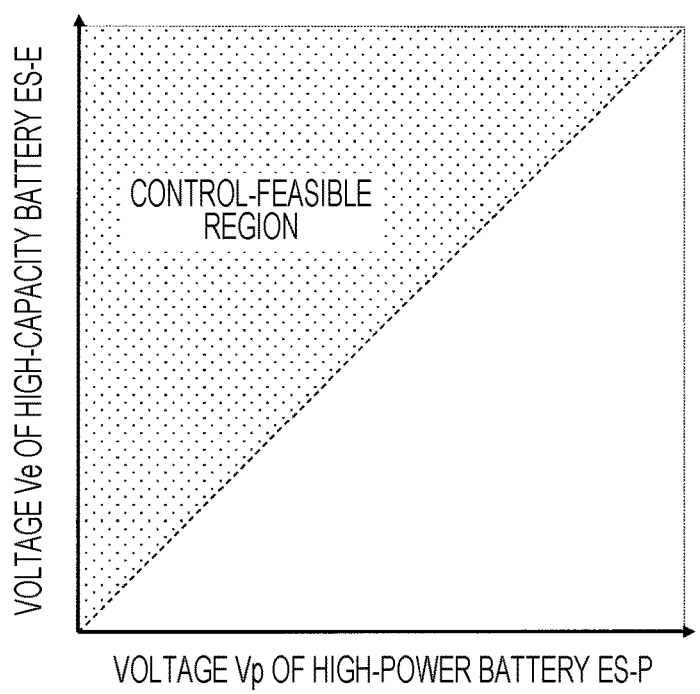
FIG. 3 is a diagram illustrating a control-feasible zone in the two-dimensional coordinate system which is determined in accordance with the relationship between the voltage of the high-capacity battery and the voltage of the high-power battery.

In the motor-driven vehicle according to this embodiment, the high-capacity battery ES-E and the high-power battery ES-P are connected in parallel to each other with respect to the PDU 105, and the voltage Ve of the high-capacity battery ES-E is directly input to the PDU 105 whereas the voltage Vp of the high-power battery ES-P, which is lower than the voltage Ve of the high-capacity battery ES-E, is boosted by the VCU 103 to a level equal to or greater than that of the voltage Ve of the high-capacity battery ES-E and is then input to the PDU 105. Accordingly, the control of the VCU 103 that performs at least the power distribution control described above according to this embodiment will not be feasible unless the voltage Ve of the high-capacity battery ES-E is higher than the voltage Vp of the high-power battery ES-P. FIG. 3 illustrates two zones obtained in accordance with the relationship between the voltage Ve of the high-capacity battery ES-E and the voltage Vp of the high-power battery ES-P. Of the two zones, a shaded zone is referred to as "control-feasible zone".

In FIG. 3, all of the regions in which the voltage Ve of the high-capacity battery ES-E is higher than the voltage Vp of the high-power battery ES-P are collectively referred to as the "control-feasible zone". Note that a maximum boosting rate and a minimum boosting rate of the VCU 103, which are greater than 1, need to be taken into account in actual use, as described below. Therefore, a region in which power distribution control taking the boosting rates described above into account is feasible is included in the "control-feasible zone" illustrated in FIG. 3 and is small.

Figure 4:
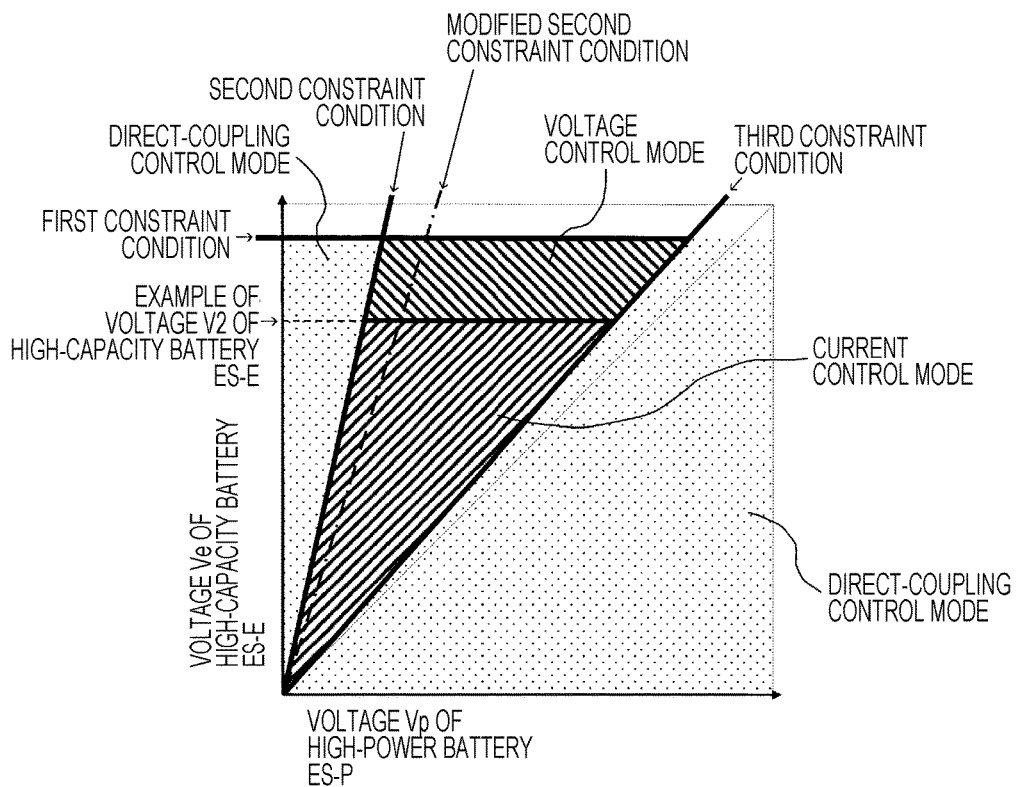
FIG. 4 is a diagram illustrating a power distribution control region that satisfies all of first to third constraint conditions within the control-feasible zone.

The region in which power distribution control taking into account the boosting rates of the VCU 103 is feasible will be described hereinafter with reference to FIG. 4. In FIG. 4, a region that satisfies all of first to third constraint conditions within the control-feasible zone illustrated in FIG. 3 is hatched with oblique lines. This region is hereinafter referred to as "power distribution control region".

The first constraint condition is that the voltage Ve of the high-capacity battery ES-E is less than or equal to a withstand voltage limit of the motor generator 101 and the PDU 105. As illustrated in FIG. 1 and FIG. 2, there is no mechanism for adjusting the voltage between the high-capacity battery ES-E and the PDU 105 or the motor generator 101. Thus, it is difficult to protect the PDU 105 and the motor generator 101 unless the voltage Ve of the high-capacity battery ES-E is less than or equal to the withstand voltage limit of the PDU 105 and the motor generator 101.

The second constraint condition is that the voltage Ve of the high-capacity battery ES-E is less than or equal to a value obtained by boosting the voltage Vp of the high-power battery ES-P 4-fold by using the VCU 103 (Ve≤4×Vp). This boosting rate (i.e., 4-fold) is an example of the maximum value (maximum boosting rate) that allows the controllability of the VCU 103 to be maintained with high probability. The term "controllability of the VCU 103" refers to ensuring that the linearity of the boosting rate with respect to the duty ratio of the VCU 103, which undergoes pulse width modulation (PWM) control, can be maintained. If the voltage Ve of the high-capacity battery ES-E is higher than a value obtained by multiplying the voltage Vp of the high-power battery ES-P by the maximum boosting rate, it is difficult to supply power from the high-power battery ES-P to the motor generator 101 during the power distribution control of the VCU 103.

The maximum boosting rate varies depending on the VCU 103. This requires the selection of the VCU 103 prior to the selection of the high-capacity battery ES-E and the high-power battery ES-P. In other words, along with the third constraint condition described below, the performance of the selected VCU 103 may exercise a dominant influence on the selection of the high-capacity battery ES-E and the high-power battery ES-P.

The third constraint condition is that the voltage Ve of the high-capacity battery ES-E is greater than or equal to a value obtained by boosting the voltage Vp of the high-power battery ES-P 1.09-fold by using the VCU 103 (Ve 1.09×Vp). This boosting rate (i.e., 1.09-fold) is an example of the minimum value of the boosting rate (minimum boosting rate) of the VCU 103, and varies depending on the VCU 103. This boosting rate can be obtained from the tolerance of a chip constituting the VCU 103 and from the build-up of detection errors caused by the voltage sensor 107p and detection errors caused by the V2 voltage sensor 109. Note that the minimum boosting rate of the VCU 103 inevitably results from variations caused by the device-to-device variability of the VCU 103. If the voltage Ve of the high-capacity battery ES-E is smaller than a value obtained by multiplying the voltage Vp of the high-power battery ES-P by the minimum boosting rate, it is difficult to supply power from the high-capacity battery ES-E to the motor generator 101 during the power distribution control of the VCU 103.

A modified second constraint condition indicated by the dot-and-dash line in FIG. 4 may be used instead of the second constraint condition. The modified second constraint condition is that the voltage Ve of the high-capacity battery ES-E is less than or equal to a value obtained by boosting the voltage Vp of the high-power battery ES-P 3-fold by using the VCU 103 (Ve≤3×Vp). This boosting rate (i.e., 3-fold) is an example of the maximum value that allows the controllability of the VCU 103 to be reliably maintained. The use of the modified second constraint condition instead of the second constraint condition may reduce the number of selectable combinations of the high-capacity battery ES-E and the high-power battery ES-P but may improve control stability. In addition, since the voltage point is closer to the center of the control-feasible zone, the feasibility of control can further be ensured.

Figure 5:
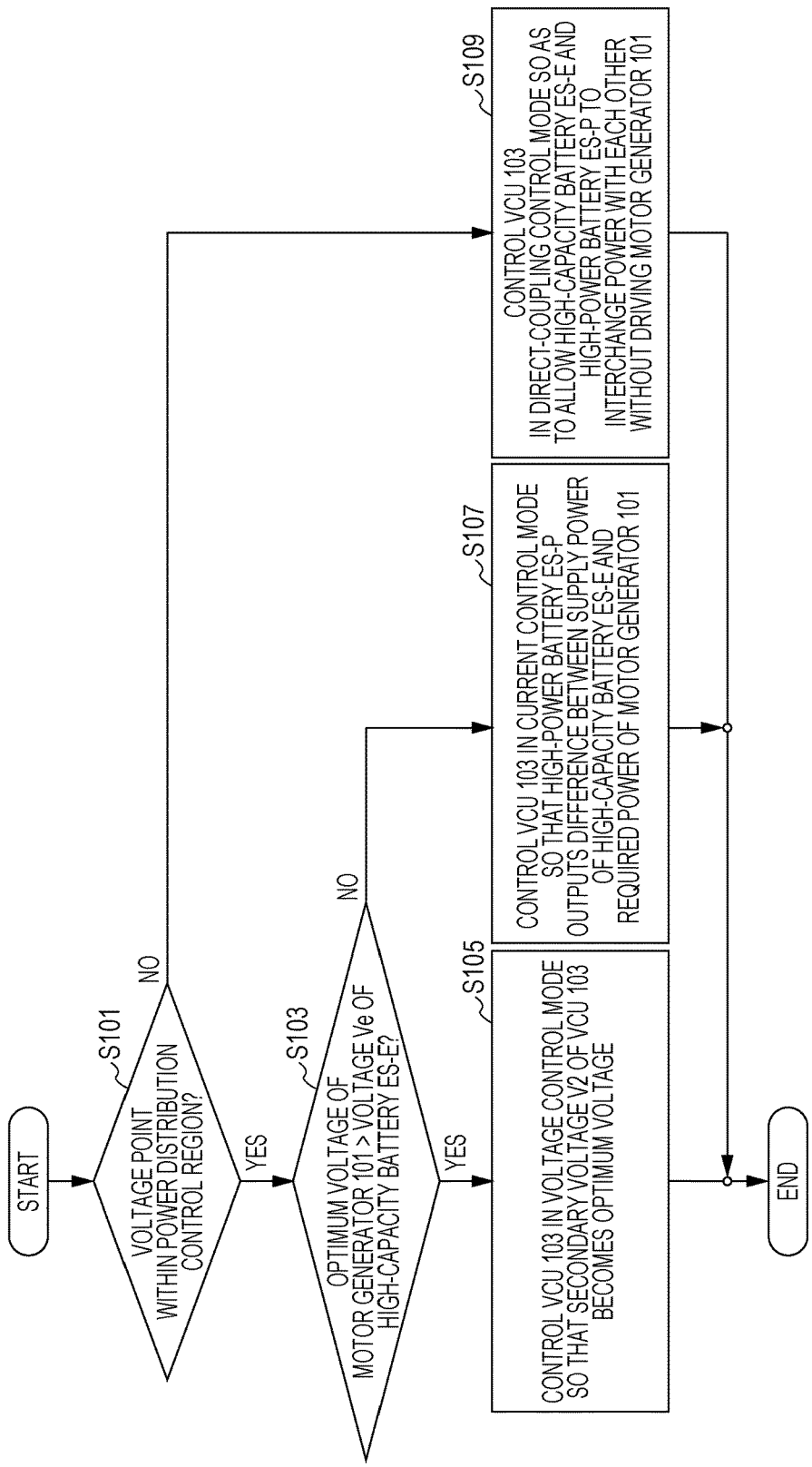
FIG. 5 is a flowchart illustrating a process flow for switching a control mode of the VCU by using the ECU.

FIG. 5 is a flowchart illustrating a process flow for switching the control mode of the VCU 103 by using the ECU 115. As illustrated in FIG. 5, if a point (hereinafter referred to as "voltage point") indicating the relationship between the voltage Ve of the high-capacity battery ES-E and the voltage Vp of the high-power battery ES-P falls within the power distribution control region hatched with oblique lines in FIG. 4 (YES in step S101) and if an optimum voltage for driving the motor generator 101 is higher than the voltage Ve of the high-capacity battery ES-E (YES in step S103), the ECU 115 controls the VCU 103 in a "voltage control mode" described below (step S105). If the voltage point falls within the power distribution control region (YES in step S101) and if the optimum voltage is less than or equal to the voltage Ve of the high-capacity battery ES-E (NO in step S103), the ECU 115 controls the VCU 103 in a "current control mode" described below (step S107). If the voltage point does not fall within the power distribution control region (NO in step S101), the ECU 115 controls the VCU 103 in a "direct-coupling control mode" described below (step S109). The three control modes described above in which the ECU 115 controls the VCU 103 will now be described.

Figure 6:
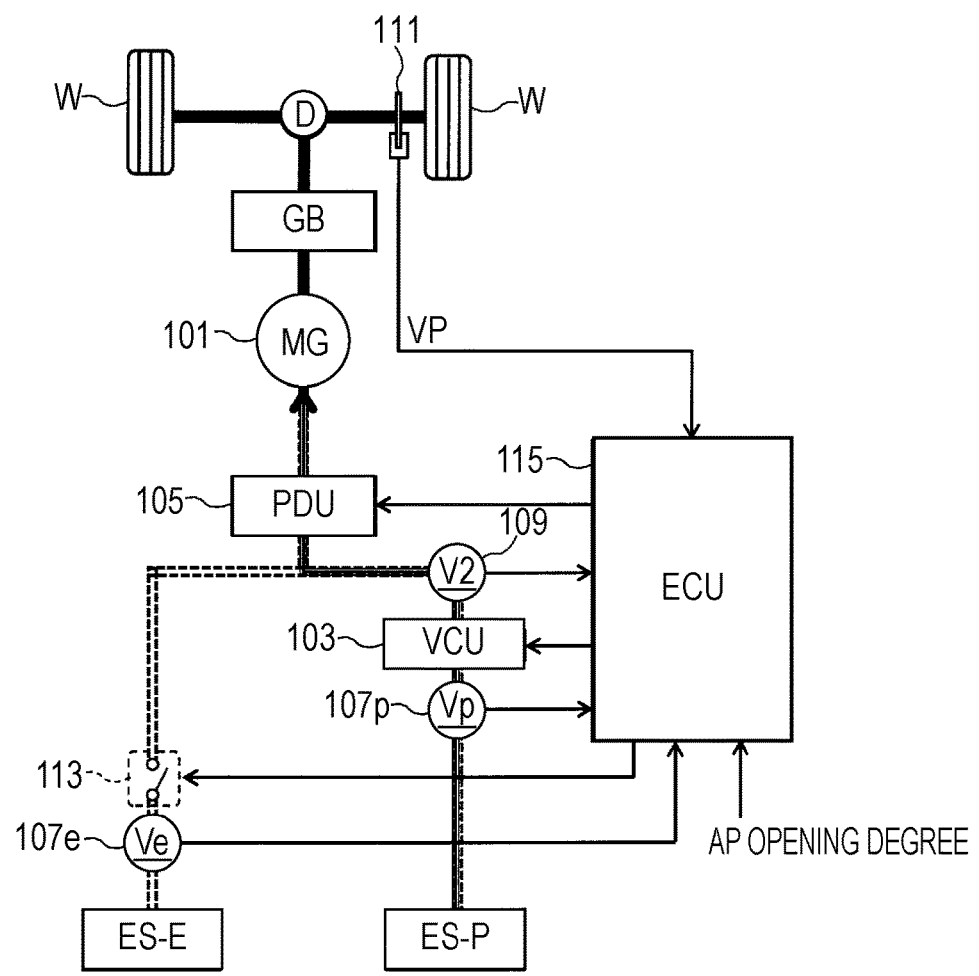
FIG. 6 is a diagram illustrating the flow of current when the VCU is controlled in a voltage control mode.

In the voltage control mode, the ECU 115 controls the contactor 113 to be opened, and, as illustrated in FIG. 6, the motor generator 101 is supplied with power only from the high-power battery ES-P. The ECU 115 controls the VCU 103 by using feedback control in which the optimum voltage of the motor generator 101 is used as an instruction value, so as to make the secondary voltage V2 of the VCU 103 equal to the optimum voltage. When the VCU 103 is controlled in the voltage control mode, the motor generator 101 can be operated with the highest driving efficiency without being affected by the voltage Ve of the high-capacity battery ES-E. Since the high-capacity battery ES-E is electrically isolated from the system by the contactor 113, the output voltage of the VCU 103 is free from the constraints of the voltage of the high-capacity battery ES-E and the output of the VCU 103 is not input to the high-capacity battery ES-E.

Figure 7:
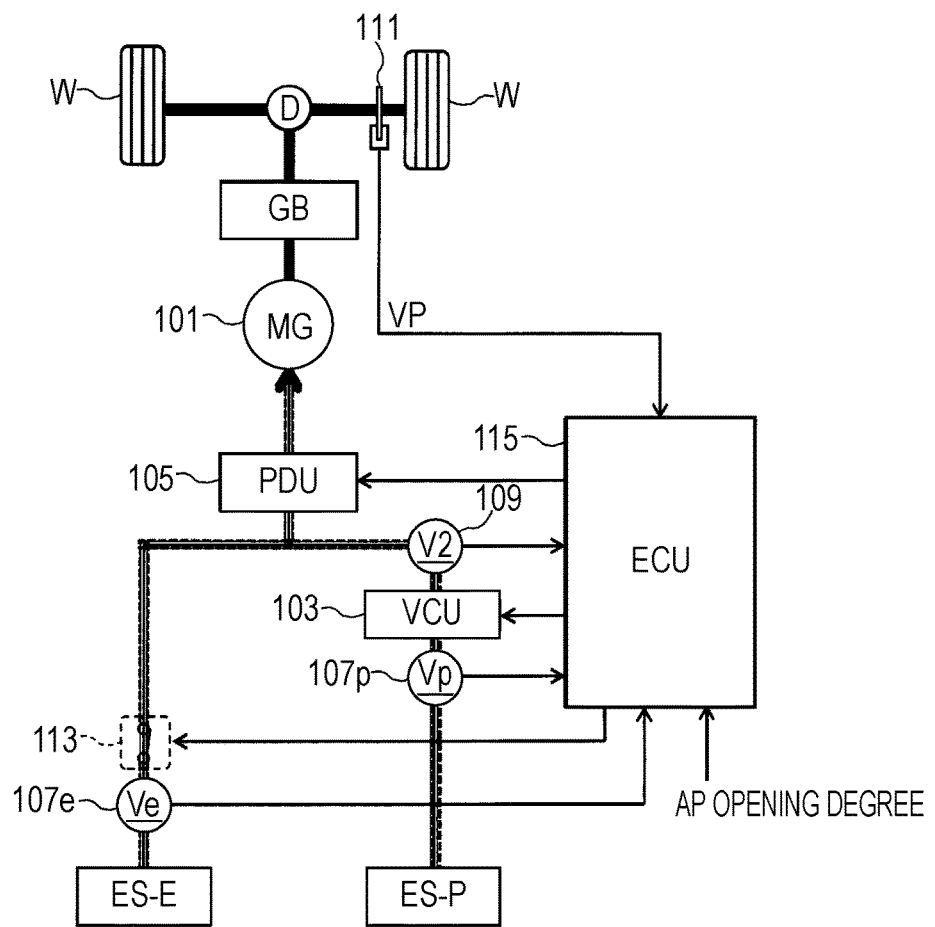
FIG. 7 is a diagram illustrating the flow of current when the VCU is controlled in a current control mode.

In the current control mode, the ECU 115 controls the contactor 113 to be closed, and, as illustrated in FIG. 7, the motor generator 101 is applied with the voltage of the high-capacity battery ES-E. If the supply power of the high-capacity battery ES-E is below the required power corresponding to the driving force required for the motor generator 101, the ECU 115 controls the VCU 103 by using feedback control so as to make the high-power battery ES-P output an amount of power corresponding to the shortfall. When the VCU 103 is controlled in the current control mode, charging and discharging exploiting the respective characteristics of the high-capacity battery ES-E and the high-power battery ES-P are realized, preventing a deterioration of the respective batteries and extending the drivable range of the motor-driven vehicle.

Figure 8:
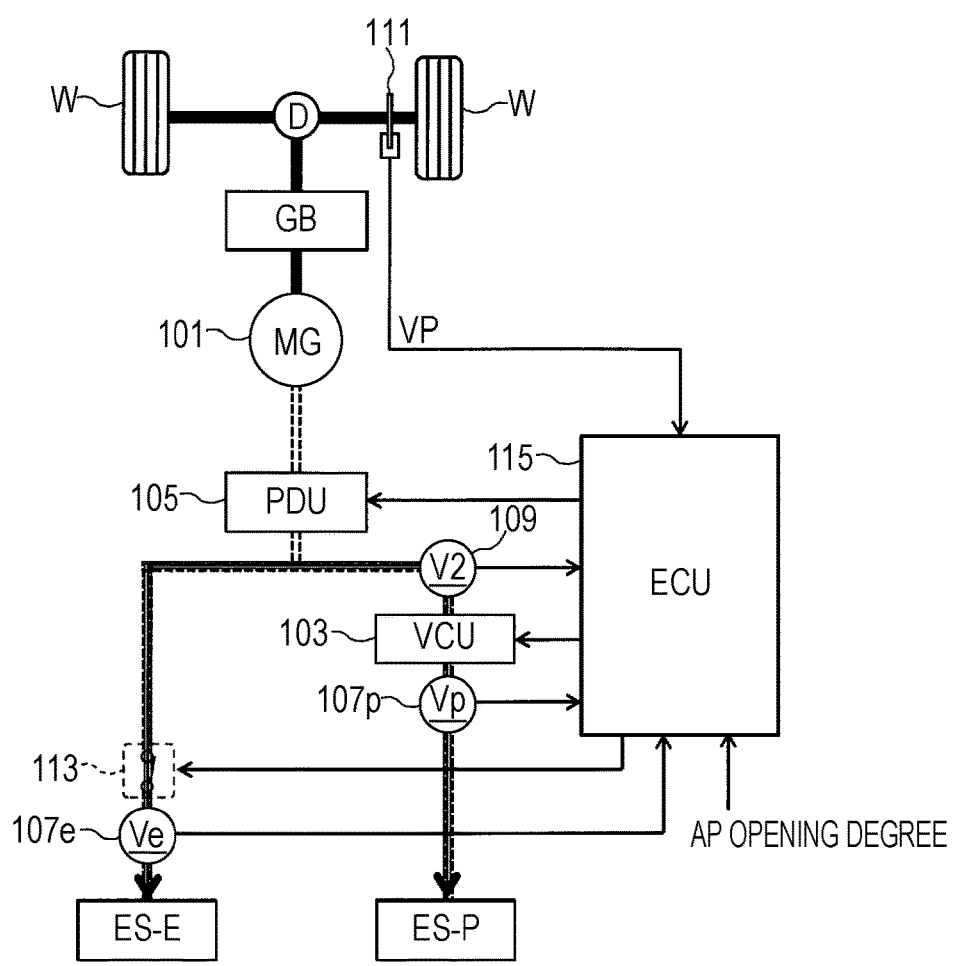
FIG. 8 is a diagram illustrating the flow of current when the VCU is controlled in a direct-coupling control mode.

In the direct-coupling control mode, the ECU 115 controls the contactor 113 to be closed, and, as illustrated in FIG. 8, the high-capacity battery ES-E and the high-power battery ES-P are connected to each other through the contactor 113, resulting in no power being supplied from the respective batteries to the motor generator 101. The ECU 115 controls the VCU 103 by using through-mode control (direct-coupling control) to allow the high-capacity battery ES-E and the high-power battery ES-P to interchange power with each other without causing the VCU 103 to boost or lower the voltage. The VCU 103 is controlled in the direct-coupling control mode, thereby allowing a voltage point in the two-dimensional coordinate system illustrated in FIG. 4 to move toward the power distribution control region.

As described above, in this embodiment, the VCU 103 is controlled in any one of the voltage control mode, the current control mode, and the direct-coupling control mode in accordance with the positional relationship between the voltage point in the two-dimensional coordinate system, which is determined by the voltage Ve of the high-capacity battery ES-E and the voltage Vp of the high-power battery ES-P, and the power distribution control region and in accordance with the magnitude relationship between the voltage Ve of the high-capacity battery ES-E and the optimum voltage of the motor generator 101. In the voltage control mode, the motor generator 101 can be operated with the highest driving efficiency without being affected by the voltage Ve of the high-capacity battery ES-E. In the current control mode, the respective batteries can be prevented from deteriorating and the drivable range of the motor-driven vehicle can be extended. In the direct-coupling control mode, the voltage point can be moved toward the power distribution control region, resulting in power being again supplied to the motor generator 101 from both the high-capacity battery ES-E and the high-power battery ES-P.

Figure 9:
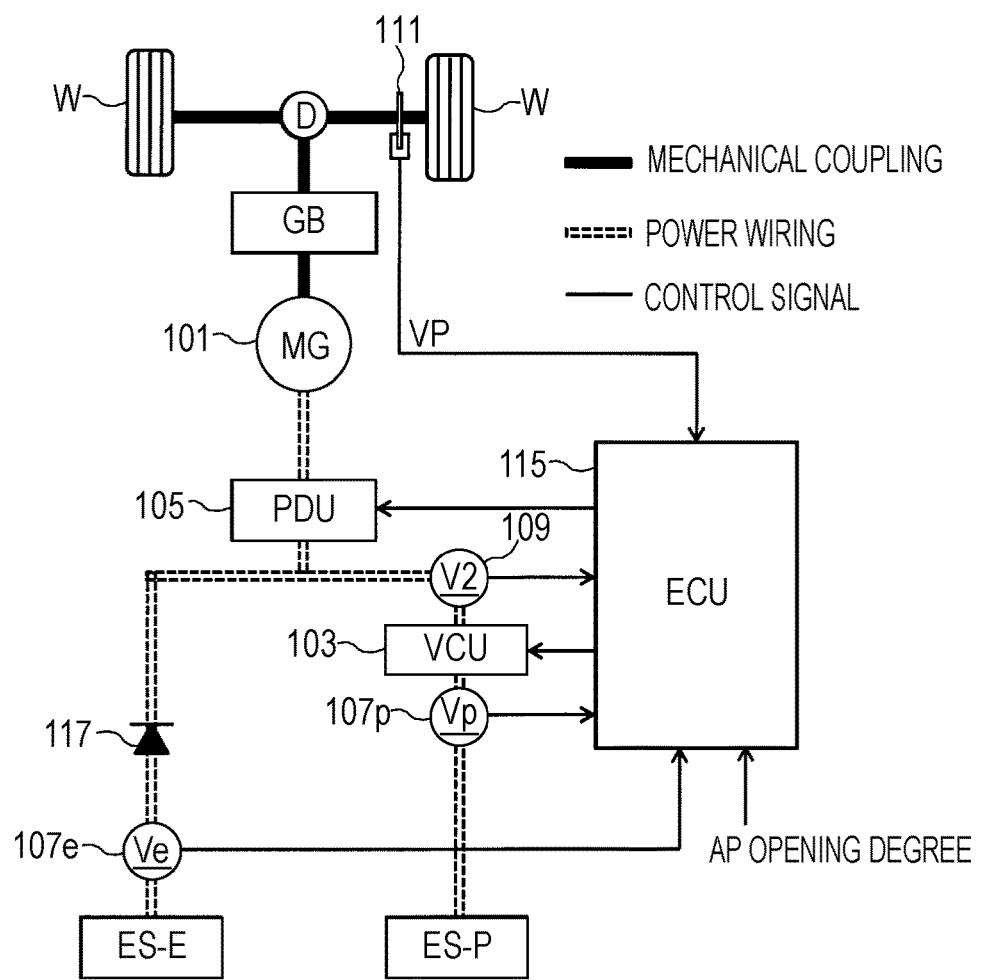
FIG. 9 is a block diagram illustrating an internal configuration of a motor-driven vehicle according to another embodiment.
Figure 10:
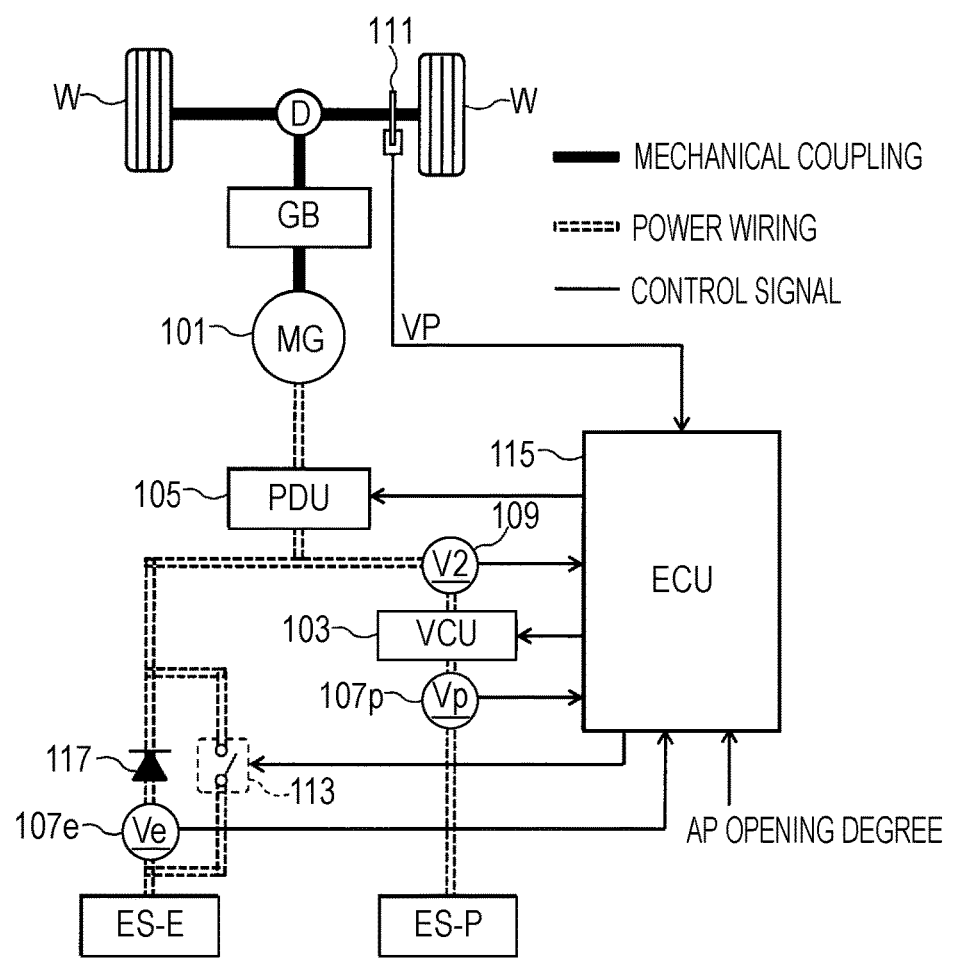
FIG. 10 is a block diagram illustrating an internal configuration of a motor-driven vehicle according to still another embodiment.

The present disclosure is not limited to the embodiment described above, and can be modified, improved, etc., as appropriate. For example, instead of the contactor 113, as illustrated in FIG. 9, a diode 117 having an anode connected to the positive terminal of the high-capacity battery ES-E may be used. When the secondary voltage V2 of the VCU 103 is higher than the voltage Ve of the high-capacity battery ES-E, the diode 117 interrupts the flow of current from the motor generator 101 or the high-power battery ES-P to the high-capacity battery ES-E. In a case where the diode 117 is included instead of the contactor 113, the ECU 115 controls the VCU 103 in the voltage control mode without controlling the contactor 113 to be opened. This allows rapid switching between the control modes. Alternatively, as illustrated in FIG. 10, instead of the connection of the diode 117, a parallel connection of the contactor 113 and the diode 117 may be provided at the corresponding position. In this case, the contactor 113 allows the high-capacity battery ES-E and the high-power battery ES-P to interchange power with each other in a two-way fashion when the VCU 103 is controlled in the direct-coupling control mode. In addition, the diode 117 allows rapid switching between the control modes.

Note that a VCU may also be disposed on the high-capacity battery ES-E side, and the functions achievable by the parallel connection of the contactor 113 and the diode 117 may be implemented by a semiconductor switch included in the VCU. The additional use of a VCU on the high-capacity battery ES-S side can make the voltage to be applied to the PDU 105 and the motor generator 101 variable even while the high-capacity battery ES-E is connected to the PDU 105.

Moreover, the motor-driven vehicle described above, which is a 1-MOT type electrical vehicle (EV), may be an EV having a plurality of motor generators mounted therein or any other vehicle, such as a hybrid electrical vehicle (HEV) or a plug-in hybrid electrical vehicle (PHEV) having mounted therein at least one motor generator and an internal combustion engine, or a fuel cell vehicle (FCV).

In addition, the voltage control mode or the current control mode in which the ECU 115 according to this embodiment controls the VCU 103 may be implemented by feedback control, as described above, or may be implemented by any other control method, such as feedforward control, in place of feedback control.

A first aspect of the embodiment provides a drive device including a first energy storage unit (for example, a high-capacity battery ES-E in the following embodiments), a second energy storage unit (for example, a high-power battery ES-P in the following embodiments) having a higher power weight density and a lower energy weight density than the first energy storage unit, a voltage converter (for example, a VCU 103 in the following embodiments) that converts a voltage output from the second energy storage unit, a driver (for example, a PDU 105 and a motor generator 101 in the following embodiments) that is driven by power supplied from at least one of the first energy storage unit and the second energy storage unit, an interrupter (for example, a contactor 113 and a diode 117 in the following embodiments) that interrupts a flow of current from the driver or the second energy storage unit to the first energy storage unit, and a controller (for example, an ECU 115 in the following embodiments) that controls the voltage converter. The controller controls the voltage converter on the basis of an optimum voltage so that the voltage converter outputs the optimum voltage, the optimum voltage being a voltage at which a driving efficiency of the driver corresponding to a driving force required for the driver is greater than or equal to a threshold value, in a case where a voltage point indicating a relationship between a voltage of the first energy storage unit and a voltage of the second energy storage unit falls within a region in a two-dimensional coordinate system with variables being the voltage of the first energy storage unit and the voltage of the second energy storage unit, the region satisfying all of a first condition in which the voltage of the first energy storage unit is less than or equal to a withstand voltage limit of the driver, a second condition in which the voltage of the first energy storage unit is less than or equal to a value obtained by converting the voltage of the second energy storage unit with a maximum conversion rate by using the voltage converter, and a third condition in which the voltage of the first energy storage unit is greater than or equal to a value obtained by converting the voltage of the second energy storage unit with a minimum conversion rate by using the voltage converter and in a case where the optimum voltage is higher than the voltage of the first energy storage unit.

A second aspect of the embodiment provides a drive device including a first energy storage unit (for example, a high-capacity battery ES-E in the following embodiments), a second energy storage unit (for example, a high-power battery ES-P in the following embodiments) having a higher power weight density and a lower energy weight density than the first energy storage unit, a voltage converter (for example, a VCU 103 in the following embodiments) that converts a voltage output from the second energy storage unit, a driver (for example, a PDU 105 and a motor generator 101 in the following embodiments) that is driven by power supplied from at least one of the first energy storage unit and the second energy storage unit, an interrupter (for example, a contactor 113 and a diode 117 in the following embodiments) that interrupts a flow of current from the driver or the second energy storage unit to the first energy storage unit, and a controller (for example, an ECU 115 in the following embodiments) that controls the voltage converter. The controller controls the voltage converter in a voltage control mode in a case where a voltage point indicating a relationship between a voltage of the first energy storage unit and a voltage of the second energy storage unit falls within a region in a two-dimensional coordinate system with variables being the voltage of the first energy storage unit and the voltage of the second energy storage unit, the region satisfying all of a first condition in which the voltage of the first energy storage unit is less than or equal to a withstand voltage limit of the driver, a second condition in which the voltage of the first energy storage unit is less than or equal to a value obtained by converting the voltage of the second energy storage unit with a maximum conversion rate by using the voltage converter, and a third condition in which the voltage of the first energy storage unit is greater than or equal to a value obtained by converting the voltage of the second energy storage unit with a minimum conversion rate by using the voltage converter and in a case where an optimum voltage is higher than the voltage of the first energy storage unit, the optimum voltage being a voltage at which a driving efficiency of the driver corresponding to a driving force required for the driver is greater than or equal to a threshold value.

A third aspect of the embodiment provides a drive device including a first energy storage unit (for example, a high-capacity battery ES-E in the following embodiments), a second energy storage unit (for example, a high-power battery ES-P in the following embodiments) having a higher power weight density and a lower energy weight density than the first energy storage unit, a voltage converter (for example, a VCU 103 in the following embodiments) that converts a voltage output from the second energy storage unit, a driver (for example, a PDU 105 and a motor generator 101 in the following embodiments) that is driven by power supplied from at least one of the first energy storage unit and the second energy storage unit, an interrupter (for example, a contactor 113 and a diode 117 in the following embodiments) that interrupts a flow of current from the driver or the second energy storage unit to the first energy storage unit, and a controller (for example, an ECU 115 in the following embodiments) that controls the voltage converter. The controller controls the voltage converter on the basis of a power of the first energy storage unit and a driving force required for the driver in such a manner as to allow power to be supplied to the driver from both the first energy storage unit and the second energy storage unit, in a case where a voltage point indicating a relationship between a voltage of the first energy storage unit and a voltage of the second energy storage unit falls within a region in a two-dimensional coordinate system with variables being the voltage of the first energy storage unit and the voltage of the second energy storage unit, the region satisfying all of a first condition in which the voltage of the first energy storage unit is less than or equal to a withstand voltage limit of the driver, a second condition in which the voltage of the first energy storage unit is less than or equal to a value obtained by converting the voltage of the second energy storage unit with a maximum conversion rate by using the voltage converter, and a third condition in which the voltage of the first energy storage unit is greater than or equal to a value obtained by converting the voltage of the second energy storage unit with a minimum conversion rate by using the voltage converter and in a case where an optimum voltage is less than or equal to the voltage of the first energy storage unit, the optimum voltage being a voltage at which a driving efficiency of the driver corresponding to the required driving force is greater than or equal to a threshold value.

A fourth aspect of the embodiment provides a drive device including a first energy storage unit (for example, a high-capacity battery ES-E in the following embodiments), a second energy storage unit (for example, a high-power battery ES-P in the following embodiments) having a higher power weight density and a lower energy weight density than the first energy storage unit, a voltage converter (for example, a VCU 103 in the following embodiments) that converts a voltage output from the second energy storage unit, a driver (for example, a PDU 105 and a motor generator 101 in the following embodiments) that is driven by power supplied from at least one of the first energy storage unit and the second energy storage unit, an interrupter (for example, a contactor 113 and a diode 117 in the following embodiments) that interrupts a flow of current from the driver or the second energy storage unit to the first energy storage unit, and a controller (for example, an ECU 115 in the following embodiments) that controls the voltage converter. The controller controls the voltage converter in a current control mode in a case where a voltage point indicating a relationship between a voltage of the first energy storage unit and a voltage of the second energy storage unit falls within a region in a two-dimensional coordinate system with variables being the voltage of the first energy storage unit and the voltage of the second energy storage unit, the region satisfying all of a first condition in which the voltage of the first energy storage unit is less than or equal to a withstand voltage limit of the driver, a second condition in which the voltage of the first energy storage unit is less than or equal to a value obtained by converting the voltage of the second energy storage unit with a maximum conversion rate by using the voltage converter, and a third condition in which the voltage of the first energy storage unit is greater than or equal to a value obtained by converting the voltage of the second energy storage unit with a minimum conversion rate by using the voltage converter and in a case where an optimum voltage is less than or equal to the voltage of the first energy storage unit, the optimum voltage being a voltage at which a driving efficiency of the driver corresponding to a driving force required for the driver is greater than or equal to a threshold value.

A fifth aspect of the embodiment provides a drive device including a first energy storage unit (for example, a high-capacity battery ES-E in the following embodiments), a second energy storage unit (for example, a high-power battery ES-P in the following embodiments) having a higher power weight density and a lower energy weight density than the first energy storage unit, a voltage converter (for example, a VCU 103 in the following embodiments) that converts a voltage output from the second energy storage unit, a driver (for example, a PDU 105 and a motor generator 101 in the following embodiments) that is driven by power supplied from at least one of the first energy storage unit and the second energy storage unit, an interrupter (for example, a contactor 113 and a diode 117 in the following embodiments) that interrupts a flow of current from the driver or the second energy storage unit to the first energy storage unit, and a controller (for example, an ECU 115 in the following embodiments) that controls the voltage converter. The controller controls the voltage converter so that the first energy storage unit and the second energy storage unit interchange power with each other, without causing the voltage converter to perform voltage conversion, in such a manner that the first energy storage unit and the second energy storage unit are connected to each other via the interrupter, in a case where a voltage point indicating a relationship between a voltage of the first energy storage unit and a voltage of the second energy storage unit does not fall within a region in a two-dimensional coordinate system with variables being the voltage of the first energy storage unit and the voltage of the second energy storage unit, the region satisfying all of a first condition in which the voltage of the first energy storage unit is less than or equal to a withstand voltage limit of the driver, a second condition in which the voltage of the first energy storage unit is less than or equal to a value obtained by converting the voltage of the second energy storage unit with a maximum conversion rate by using the voltage converter, and a third condition in which the voltage of the first energy storage unit is greater than or equal to a value obtained by converting the voltage of the second energy storage unit with a minimum conversion rate by using the voltage converter.

The maximum conversion rate may be a limit value at which controllability of the voltage converter is maintained when at least one of the first energy storage unit and the second energy storage unit supplies power to the driver.

Thus, the controllability of the voltage converter for the supply of power to the driver can be ensured.

The drive device may further include a first sensor (for example, a voltage sensor 107p in the following embodiments) that detects the voltage of the second energy storage unit, and a second sensor (for example, a V2 voltage sensor 109 in the following embodiments) that detects a value obtained by converting the voltage of the second energy storage unit by using the voltage converter, and the minimum conversion rate may be a value that is based on a tolerance of the voltage converter and a detection error caused by the first sensor and the second sensor.

Thus, the controllability of the voltage converter for the supply of power to the driver can be ensured taking into account a minimum conversion rate that inevitably occurs due to the variations in the conversion rate of the voltage converter.

A sixth aspect of the embodiment provides a transport apparatus including the drive device described above.

A seventh aspect of the embodiment provides a method for controlling a drive device, the drive device including a first energy storage unit (for example, a high-capacity battery ES-E in the following embodiments), a second energy storage unit (for example, a high-power battery ES-P in the following embodiments) having a higher power weight density and a lower energy weight density than the first energy storage unit, a voltage converter (for example, a VCU 103 in the following embodiments) that converts a voltage output from the second energy storage unit, a driver (for example, a PDU 105 and a motor generator 101 in the following embodiments) that is driven by power supplied from at least one of the first energy storage unit and the second energy storage unit, an interrupter (for example, a contactor 113 and a diode 117 in the following embodiments) that interrupts a flow of current from the driver or the second energy storage unit to the first energy storage unit, and a controller (for example, an ECU 115 in the following embodiments) that controls the voltage converter. The method includes controlling, by the controller, the voltage converter on the basis of an optimum voltage so that the voltage converter outputs the optimum voltage, the optimum voltage being a voltage at which a driving efficiency of the driver corresponding to a driving force required for the driver is greater than or equal to a threshold value, in a case where a voltage point indicating a relationship between a voltage of the first energy storage unit and a voltage of the second energy storage unit falls within a region in a two-dimensional coordinate system with variables being the voltage of the first energy storage unit and the voltage of the second energy storage unit, the region satisfying all of a first condition in which the voltage of the first energy storage unit is less than or equal to a withstand voltage limit of the driver, a second condition in which the voltage of the first energy storage unit is less than or equal to a value obtained by converting the voltage of the second energy storage unit with a maximum conversion rate by using the voltage converter, and a third condition in which the voltage of the first energy storage unit is greater than or equal to a value obtained by converting the voltage of the second energy storage unit with a minimum conversion rate by using the voltage converter and in a case where the optimum voltage is higher than the voltage of the first energy storage unit.

An eighth aspect of the embodiment provides a method for controlling a drive device, the drive device including a first energy storage unit (for example, a high-capacity battery ES-E in the following embodiments), a second energy storage unit (for example, a high-power battery ES-P in the following embodiments) having a higher power weight density and a lower energy weight density than the first energy storage unit, a voltage converter (for example, a VCU 103 in the following embodiments) that converts a voltage output from the second energy storage unit, a driver (for example, a PDU 105 and a motor generator 101 in the following embodiments) that is driven by power supplied from at least one of the first energy storage unit and the second energy storage unit, an interrupter (for example, a contactor 113 and a diode 117 in the following embodiments) that interrupts a flow of current from the driver or the second energy storage unit to the first energy storage unit, and a controller (for example, an ECU 115 in the following embodiments) that controls the voltage converter. The method includes controlling, by the controller, the voltage converter on the basis of a power of the first energy storage unit and a driving force required for the driver in such a manner as to allow power to be supplied to the driver from both the first energy storage unit and the second energy storage unit, in a case where a voltage point indicating a relationship between a voltage of the first energy storage unit and a voltage of the second energy storage unit falls within a region in a two-dimensional coordinate system with variables being the voltage of the first energy storage unit and the voltage of the second energy storage unit, the region satisfying all of a first condition in which the voltage of the first energy storage unit is less than or equal to a withstand voltage limit of the driver, a second condition in which the voltage of the first energy storage unit is less than or equal to a value obtained by converting the voltage of the second energy storage unit with a maximum conversion rate by using the voltage converter, and a third condition in which the voltage of the first energy storage unit is greater than or equal to a value obtained by converting the voltage of the second energy storage unit with a minimum conversion rate by using the voltage converter and in a case where an optimum voltage is less than or equal to the voltage of the first energy storage unit, the optimum voltage being a voltage at which a driving efficiency of the driver corresponding to the required driving force is greater than or equal to a threshold value.

A ninth aspect of the embodiment provides a method for controlling a drive device, the drive device including a first energy storage unit (for example, a high-capacity battery ES-E in the following embodiments), a second energy storage unit (for example, a high-power battery ES-P in the following embodiments) having a higher power weight density and a lower energy weight density than the first energy storage unit, a voltage converter (for example, a VCU 103 in the following embodiments) that converts a voltage output from the second energy storage unit, a driver (for example, a PDU 105 and a motor generator 101 in the following embodiments) that is driven by power supplied from at least one of the first energy storage unit and the second energy storage unit, an interrupter (for example, a contactor 113 and a diode 117 in the following embodiments) that interrupts a flow of current from the driver or the second energy storage unit to the first energy storage unit, and a controller (for example, an ECU 115 in the following embodiments) that controls the voltage converter. The method includes controlling, by the controller, the voltage converter so that the first energy storage unit and the second energy storage unit interchange power with each other, without causing the voltage converter to perform voltage conversion, in such a manner that the first energy storage unit and the second energy storage unit are connected to each other via the interrupter, in a case where a voltage point indicating a relationship between a voltage of the first energy storage unit and a voltage of the second energy storage unit does not fall within a region in a two-dimensional coordinate system with variables being the voltage of the first energy storage unit and the voltage of the second energy storage unit, the region satisfying all of a first condition in which the voltage of the first energy storage unit is less than or equal to a withstand voltage limit of the driver, a second condition in which the voltage of the first energy storage unit is less than or equal to a value obtained by converting the voltage of the second energy storage unit with a maximum conversion rate by using the voltage converter, and a third condition in which the voltage of the first energy storage unit is greater than or equal to a value obtained by converting the voltage of the second energy storage unit with a minimum conversion rate by using the voltage converter.

According to the first, second, sixth, and seventh aspects, the relationship between the voltage of the first energy storage unit and the voltage of the second energy storage unit ensures the controllability of the voltage converter for the supply of power to the driver. In addition, when the optimum voltage of the driver is higher than the voltage of the first energy storage unit, the voltage converter can convert the voltage of the second energy storage unit into the optimum voltage and the driver can be driven by the optimum voltage. This allows the driver to be operated with the highest driving efficiency without being affected by the voltage of the first energy storage unit. Since the first energy storage unit is electrically isolated from the system by the interrupter, the output voltage of the voltage converter is free from the constraints of the voltage of the first energy storage unit and the output of the voltage converter is not input to the first energy storage unit.

According to the third, fourth, sixth, and eighth aspects, the relationship between the voltage of the first energy storage unit and the voltage of the second energy storage unit ensures the controllability of the voltage converter for the supply of power to the driver. In addition, when the optimum voltage of the driver is less than or equal to the voltage of the first energy storage unit, the voltage converter is controlled to supply the power required for the driver from both the first energy storage unit or the first energy storage unit and the second energy storage unit, thereby allowing charging and discharging exploiting the respective characteristics of the first energy storage unit and the second energy storage unit to be realized. This can prevent the respective energy storage units from deteriorating and can extend the drivable range of a motor-driven vehicle having the drive device mounted therein.

According to the fifth, sixth, and ninth aspects, if the relationship between the voltage of the first energy storage unit and the voltage of the second energy storage unit does not ensure the controllability of the voltage converter for the supply of power to the driver, no power is supplied from the first energy storage unit or the second energy storage unit to the driver. The voltage converter is controlled so that the first energy storage unit and the second energy storage unit interchange power with each other without performing voltage conversion. This can make a transition to the relationship between the voltage of the first energy storage unit and the voltage of the second energy storage unit, which provides the controllability of the voltage converter for the supply of power to the driver. In consequence, power can be supplied again to the driver from both the first energy storage unit and the second energy storage unit.

Obviously, numerous modifications and variations of the present invention are possible in light of the above teachings. It is therefore to be understood that within the scope of the appended claims, the invention may be practiced otherwise than as specifically described herein.

What is claimed is:

1. A drive device comprising:
a first energy storage having a first power weight density and a first energy weight density;
a second energy storage having a second power weight density higher than the first power weight density and a second energy weight density lower than the first weight density;
a voltage converter to convert a voltage output from the second energy storage;
a driver to be driven with power supplied from at least one of the first energy storage and the second energy storage; and
circuitry configured to
interrupt current from the driver or from the second energy storage to the first energy storage; and
control the voltage converter based on an optimum voltage to output the optimum voltage, with which a driving efficiency of the driver according to a required driving force for the driver is greater than or equal to a threshold value, in a case where the optimum voltage is higher than the voltage of the first energy storage and where a relationship between a voltage output by the first energy storage and a voltage output by the second energy storage satisfies all of a first condition, a second condition, and a third condition, the voltage of the first energy storage being less than or equal to a withstand voltage limit of the driver in the first condition, the voltage of the first energy storage being less than or equal to a first value and the voltage converter converting the voltage of the second energy storage with a maximum conversion rate so as to obtain the first value in the second condition, the voltage of the first energy storage being greater than or equal to a second value and the voltage converter converting the voltage of the second energy storage with a minimum conversion rate so as to obtain the second value in the third condition.

2. The drive device according to claim 1, wherein the maximum conversion rate is a limit value at which controllability of the voltage converter is maintained when at least one of the first energy storage and the second energy storage supplies power to the driver.

3. The drive device according to claim 1, further comprising:
a first sensor that detects the voltage of the second energy storage; and
a second sensor that detects a value obtained by converting the voltage of the second energy storage with the voltage converter
wherein the minimum conversion rate is a value that is based on a tolerance of the voltage converter and a detection error caused by the first sensor and the second sensor.

4. A transport apparatus comprising the drive device according to claim 1.

5. A drive device comprising:
a first energy storage having a first power weight density and a first energy weight density;
a second energy storage having a second power weight density higher than the first power weight density and a second energy weight density lower than the first weight density;
a voltage converter to convert a voltage output from the second energy storage;
a driver to be driven with power supplied from at least one of the first energy storage and the second energy storage; and
circuitry configured to
interrupt current from the driver or from the second energy storage to the first energy storage; and
control the voltage converter based on a power of the first energy storage and a required driving force for the driver in such a manner as to allow power to be supplied to the driver from both the first energy storage and the second energy storage in a case where an optimum voltage, with which a driving efficiency of the driver according to a required driving force for the driver is greater than or equal to a threshold value, is less than or equal to the voltage of the first energy storage and where a relationship between a voltage output by the first energy storage and a voltage output by the second energy storage satisfies all of a first condition, a second condition, and a third condition, the voltage of the first energy storage being less than or equal to a withstand voltage limit of the driver in the first condition, the voltage of the first energy storage being less than or equal to a first value and the voltage converter converting the voltage of the second energy storage with a maximum conversion rate so as to obtain the first value in the second condition, the voltage of the first energy storage being greater than or equal to a second value and the voltage converter converting the voltage of the second energy storage with a minimum conversion rate so as to obtain the second value in the third condition.

6. The drive device according to claim 5, wherein the maximum conversion rate is a limit value at which controllability of the voltage converter is maintained when at least one of the first energy storage and the second energy storage supplies power to the driver.

7. The drive device according to claim 5, further comprising:
a first sensor that detects the voltage of the second energy storage; and
a second sensor that detects a value obtained by converting the voltage of the second energy storage with the voltage converter
wherein the minimum conversion rate is a value that is based on a tolerance of the voltage converter and a detection error caused by the first sensor and the second sensor.

8. A drive device comprising:
a first energy storage having a first power weight density and a first energy weight density;
a second energy storage having a second power weight density higher than the first power weight density and a second energy weight density lower than the first weight density;
a voltage converter to convert a voltage output from the second energy storage;
a driver to be driven with power supplied from at least one of the first energy storage and the second energy storage; and
circuitry configured to interrupt current from the driver or from the second energy storage to the first energy storage; and
control the voltage converter so that the first energy storage and the second energy storage interchange power with each other, without voltage conversion by the voltage converter, in such a manner that the first energy storage and the second energy storage are connected to each other via an interrupter in a case where a relationship between a voltage output by the first energy storage and a voltage output by the second energy storage does not satisfy all of a first condition, a second condition, and a third condition, the voltage of the first energy storage being less than or equal to a withstand voltage limit of the driver in the first condition, the voltage of the first energy storage being less than or equal to a first value and the voltage converter converting the voltage of the second energy storage with a maximum conversion rate so as to obtain the first value in the second condition, the voltage of the first energy storage being greater than or equal to a second value and the voltage converter converting the voltage of the second energy storage with a minimum conversion rate so as to obtain the second value in the third condition.

9. The drive device according to claim 8, wherein
the maximum conversion rate is a limit value at which controllability of the voltage converter is maintained when at least one of the first energy storage and the second energy storage supplies power to the driver.

10. The drive device according to claim 8, further comprising:
a first sensor that detects the voltage of the second energy storage; and
a second sensor that detects a value obtained by converting the voltage of the second energy storage with the voltage converter
wherein the minimum conversion rate is a value that is based on a tolerance of the voltage converter and a detection error caused by the first sensor and the second sensor.

11. A method for controlling a drive device, comprising:
interrupting current from a driver or from a second energy storage to a first energy storage; and
controlling a voltage converter based on an optimum voltage to output the optimum voltage, with which a driving efficiency of the driver according to a required driving force for the driver is greater than or equal to a threshold value, in a case where the optimum voltage is higher than the voltage of the first energy storage and where a relationship between a voltage output by the first energy storage and a voltage output by the second energy storage satisfies all of a first condition, a second condition, and a third condition, the voltage of the first energy storage being less than or equal to a withstand voltage limit of the driver in the first condition, the voltage of the first energy storage being less than or equal to a first value and the voltage converter converting the voltage of the second energy storage with a maximum conversion rate so as to obtain the first value in the second condition, the voltage of the first energy storage being greater than or equal to a second value and the voltage converter converting the voltage of the second energy storage with a minimum conversion rate so as to obtain the second value in the third condition.

12. A method for controlling a drive device, comprising:
interrupting current from a driver or from a second energy storage to a first energy storage; and
controlling a voltage converter based on a power of the first energy storage and a required driving force for the driver in such a manner as to allow power to be supplied to the driver from both the first energy storage and the second energy storage in a case where an optimum voltage, with which a driving efficiency of the driver according to a required driving force for the driver is greater than or equal to a threshold value, is less than or equal to the voltage of the first energy storage and where a relationship between a voltage output by the first energy storage and a voltage output by the second energy storage satisfies all of a first condition, a second condition, and a third condition, the voltage of the first energy storage being less than or equal to a withstand voltage limit of the driver in the first condition, the voltage of the first energy storage being less than or equal to a first value and the voltage converter converting the voltage of the second energy storage with a maximum conversion rate so as to obtain the first value in the second condition, the voltage of the first energy storage being greater than or equal to a second value and the voltage converter converting the voltage of the second energy storage with a minimum conversion rate so as to obtain the second value in the third condition.

13. A method for controlling a drive device, comprising:
interrupting current from a driver or from a second energy storage to a first energy storage; and
controlling a voltage converter so that the first energy storage and the second energy storage interchange power with each other, without voltage conversion by the voltage converter, in such a manner that the first energy storage and the second energy storage are connected to each other via an interrupter in a case where a relationship between a voltage output by the first energy storage and a voltage output by the second energy storage does not satisfy all of a first condition, a second condition, and a third condition, the voltage of the first energy storage being less than or equal to a withstand voltage limit of the driver in the first condition, the voltage of the first energy storage being less than or equal to a first value and the voltage converter converting the voltage of the second energy storage with a maximum conversion rate so as to obtain the first value in the second condition, the voltage of the first energy storage being greater than or equal to a second value and the voltage converter converting the voltage of the second energy storage with a minimum conversion rate so as to obtain the second value in the third condition.

* * * * *